Patented Apr. 9, 1946

2,398,103

UNITED STATES PATENT OFFICE 2,398,103

PYROLYSIS OF ESTERS OF 1-ALKEN-4-OLS TO PRODUCE DIOLEFINS

John R. Long, Akron, Ohio, assignor to Wingfoot Corporation, Akron, Ohio, a corporation of Delaware No Drawing. Application August 16, 1941, Serial No. 407,235

8 Claims. (Cl. 260—681)

This invention relates to an improved method of obtaining diene hydrocarbons from unsaturated alcohols. More particularly, it relates to a method of pyrolyzing certain derivatives of 1-alken-4-ols to obtain dienes therefrom.

Members of the class of alcohols or carbinols termed 1-alken-4-ols are available as raw materials for the preparation of unsaturated hydrocarbons but the treatments heretofore used for converting these alcohols either do not give the desired diene hydrocarbons or the yield is low. Thus, dehydration of these carbinols over alumina in the vapor phase results merely in breaking the carbon chain to give a mono olefin and either an aldehyde or a ketone. For example, if 2-methyl-1-penten-4-ol be passed over alumina in the vapor phase at a temperature of 430–50° C., the products are acetaldehyde and isobutylene, no diene hydrocarbons being recovered. The reaction is as follows:

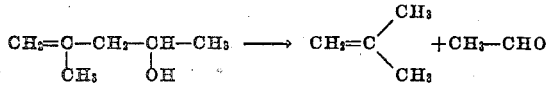

On the other hand, if it be attempted to dehydrate the 1-alken-4-ol in the liquid phase in the presence of an acid catalyst, low yields are obtained because the hydrocarbon which is formed remains a relatively long time in contact with the catalyst and polymerization products result.

Since the foregoing methods are unsatisfactory, the present invention contemplates the provision of a method by which these 1-alken-4-ols can be readily caused to yield diene hydrocarbons in an efficient manner. The improved results are achieved by first converting the 1-alken-4-ol to its acetate or other carboxylate by appropriate treatment and then pyrolyzing the acetate under suitable conditions. The pyrolysis removes a molecule of acetic acid and leaves a diene hydrocarbon. Taking 1-penten-4-ol as an example, the reactions involved are as follows:

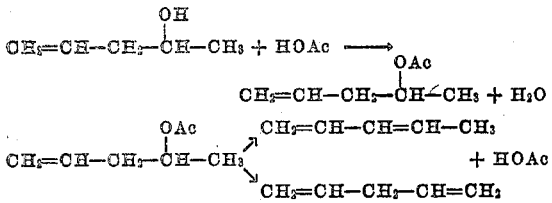

The acetylation may be accomplished by the use of acetic anhydride, preferably, or acetyl chloride may be used, the acetylation taking place readily at a temperature of 100–120° C., or thereabouts. The acetate is then pyrolyzed by passing the same through a tube heated to a temperature of about 500–600° C., the preferred range being from 550–570° C. Thereafter, the acetic acid and hydrocarbons are easily separated, to obtain the desired product.

To illustrate the process and to compare the same with other methods, the following examples are given, although it will be understood that the invention is not limited by such examples.

EXAMPLE 1

1-penten-4-ol in the amount of 218 grams was passed at the rate of 2 cc. per minute through a mass of activated alumina having a volume of 90 cc. and made up of 8–14 mesh particles. The alumina was heated to a temperature of 430–440° C. and the pressure was 200–250 mm./Hg. The vapors leaving the reaction zone were cooled in a water condenser and the product was collected in a receiver, cooled in a dry ice-acetone bath. This product had the sharp odor of acetaldehyde. It was first washed with dilute sodium hydroxide and dried and was then distilled to give a yield of 20% of a mixture of 1,3- and 1,4-pentadienes.

EXAMPLE 2

In this instance, 2-methyl-1-penten-4-ol was subjected to the same treatment as that employed in Example 1. There was obtained acetaldehyde and an unsaturated gaseous hydrocarbon. None of the desired methyl pentadienes was obtained.

EXAMPLE 3

If acetates of the unsaturated alcohols treated in Examples 1 and 2 be first prepared and then pyrolyzed, a much more satisfactory yield is secured. Thus, the acetate of 1-penten-4-ol was passed at the rate of 2–3 cc. per minute through a pyrolysis tube packed with glass wool and having a volume of 90 cc. The temperature prevailing was 550–570° C. and the pressure was 70–80 mm. The exit gases were cooled by means of a water condenser and the product was collected in a receiver cooled in a dry ice-acetone bath. The condensate was fractionated to give a 69% yield of a mixture of 1,3- and 1,4-pentadienes.

EXAMPLE 4

In this experiment, the reaction zone was provided with a 22 mm. pyrex tube filled with copper turnings and heated in a 2-foot furnace to a temperature of 525–50° C., the pressure being that corresponding to 100 mm./Hg. Through this tube was passed the acetate of 2-methyl-1-penten-4-ol at the rate of 2-3 cc. per minute. The condensate was distilled and collected in a cooled vessel to give a 76% yield of a mixture of methyl pentadienes. The reaction probably proceeds as follows:

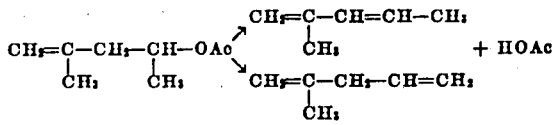

It will be observed that in the last two examples good yields of the desired pentadienes were obtained, whereas in the first two examples the yield was either so small as to be impractical for commercial purposes or was entirely negative. In each instance, a quantity of undesired acetaldehyde was obtained, the presence of acetaldehyde indicating a breaking of the carbon chain and consequent waste of raw material. While reduced pressures are employed in Examples 3 and 4, it has been observed that such low pressures are not strictly necessary but that the pyrolysis of the acetates may be carried out at higher pressures, say at atmospheric pressure or even under positive pressures.

The method is applicable to the preparation of various diene hydrocarbons as will be apparent, 1-penten-4-ol and 2-methyl-1-penten-4-ol being merely exemplary of the alcohols which may be converted to their acetates and subsequently pyrolyzed to yield diene hydrocarbons. Other alcohols which may be thus treated are the following: 3-methyl-1-penten-4-ol, 2-ethyl-1-penten-4-ol, 1-hexene-4-ol, 2-methyl-1-hexene-4-ol, 1-heptene-4-ol, and similar unsaturated alcohols. Since the acid radical which is introduced into the alcohol molecule is removed during pyrolysis, the identity of such radical may be varied. Thus, in place of the acetate there may be formed the formate, propionate, etc. of the alcohol. However, in view of the greater availability of acetic acid and its compounds, this acid is preferred.

While there have been described above the preferred embodiments of the invention, it will be apparent to those skilled in the art that various modifications and changes may be made therein without departing from the spirit of the invention or from the scope of the appended claims.

I claim:

1. A method of producing diene hydrocarbons which comprises pyrolyzing an acylated 1-alken-4-ol at a temperature between about 500° and 600° C. to remove a molecule of carboxylic acid therefrom and then separating the hydrocarbon from the acid.

2. A method of producing diene hydrocarbons which comprises pyrolyzing an acetylated 1-alken-4-ol at a temperature between about 500° and 600° C. to remove a molecule of acetic acid therefrom and then separating the hydrocarbon from the acetic acid.

3. A method of producing diene hydrocarbons which comprises pyrolyzing acetylated 1-penten-4-ol at a temperature between about 500° and 600° C. to remove a molecule of acetic acid therefrom and then separating the pentadienes so formed from the acetic acid.

4. A method of producing diene hydrocarbons which comprises pyrolyzing acetylated 2-methyl-1-penten-4-ol at a temperature between about 500° and 600° C. to remove a molecule of acetic acid therefrom and then separating the methyl pentadienes so formed from the acetic acid.

5. A method of producing diene hydrocarbons which comprises acylating a 1-alken-4-ol, pyrolyzing the acylated 1-alken-4-ol at a temperature between about 500° and 600° C. to remove a molecule of carboxylic acid therefrom and then separating the hydrocarbon so formed from the acid.

6. A method of producing diene hydrocarbons which comprises acetylating a 1-alken-4-ol, pyrolyzing the acetylated 1-alken-4-ol at a temperature between about 500° and 600° C. to remove a molecule of acetic acid therefrom and then separating the hydrocarbon so formed from the acid.

7. A method of producing diene hydrocarbons which comprises acetylating 1-penten-4-ol, pyrolyzing the 1-penten-4-acetate so formed at a temperature between about 500° and 600° C. to remove a molecule of acetic acid therefrom and then separating the resulting pentadienes from the acetic acid.

8. A method of producing diene hydrocarbons which comprises acetylating 2-methyl-1-penten-4-ol, pyrolyzing the 2-methyl-1-penten-4-acetate so formed at a temperature between about 550° and 570° C. to remove a molecule of acetic acid therefrom and then separating the resulting methyl pentadienes from the acetic acid.

JOHN R. LONG.